(12) United States Patent
Herbin et al.

(10) Patent No.: US 10,017,101 B2
(45) Date of Patent: Jul. 10, 2018

(54) LIGHTING DEVICE, NOTABLY FOR MOTOR VEHICLES, AND LIGHTING AND/OR SIGNALLING MODULE INCLUDING SUCH A DEVICE

(71) Applicant: Valeo Vision Belgique, Meslin l'Eveque (BE)

(72) Inventors: Cyril Herbin, Potelle (FR); Christophe Valois, Hasnon (FR); Benony Grigorescu, Waterloo (BE); Eric Werquin, Assevent (FR)

(73) Assignee: Valeo Vision Belgique, Meslin l'Eveque (BE)

( * ) Notice: Subject to any disclaimer, the term of this patent is extended or adjusted under 35 U.S.C. 154(b) by 101 days.

(21) Appl. No.: 15/164,029

(22) Filed: May 25, 2016

(65) Prior Publication Data

US 2016/0347234 A1    Dec. 1, 2016

(30) Foreign Application Priority Data

May 27, 2015  (FR) ...................................... 15 54780

(51) Int. Cl.
*F21V 9/00*    (2018.01)
*B60Q 1/00*    (2006.01)
(Continued)

(52) U.S. Cl.
CPC ............ *B60Q 1/0011* (2013.01); *F21S 41/24* (2018.01); *F21S 41/322* (2018.01); *F21S 43/237* (2018.01); *F21S 43/241* (2018.01); *F21S 43/245* (2018.01); *F21S 43/249* (2018.01); *F21S 43/251* (2018.01); *F21S 48/1241* (2013.01); *F21S 48/1329* (2013.01); *F21S 48/225* (2013.01); *F21S 48/2237* (2013.01); *F21S 48/2268* (2013.01);
(Continued)

(58) Field of Classification Search
CPC ............................................. H01L 2224/48091
See application file for complete search history.

(56) References Cited

U.S. PATENT DOCUMENTS 5,321,586 A * 6/1994 Hege .................... B60Q 1/0011
362/227
8,870,423 B2  10/2014 Mihara et al.
(Continued)

FOREIGN PATENT DOCUMENTS

EP    2489550 A2    8/2012
EP    2525139 A2   11/2012
(Continued)

OTHER PUBLICATIONS

English machine translation of EP 2 620 790 Faffelberger, Jan. 2013.*

*Primary Examiner* — Evan Dzierzynski
(74) *Attorney, Agent, or Firm* — Oblon, McClelland, Maier & Neustadt, L.L.P.

(57) ABSTRACT

A lighting device, notably for motor vehicles, including two so-called principal light guides and a so-called connecting light guide, each principal guide including a lateral surface, the connecting guide being continuous with both of the principal guides at the level of their respective lateral surface, the device being configured to feed the connecting guide with light from the principal guides. The invention further concerns a lighting module including such a device.

18 Claims, 3 Drawing Sheets

(51) Int. Cl.
    *F21S 41/32*     (2018.01)
    *F21S 43/241*     (2018.01)
    *F21S 41/24*     (2018.01)
    *F21S 43/249*     (2018.01)
    *F21S 43/237*     (2018.01)
    *F21S 43/245*     (2018.01)
    *F21S 43/251*     (2018.01)
    *F21S 8/10*     (2006.01)
    *F21V 8/00*     (2006.01)

(52) U.S. Cl.
    CPC ....... *F21S 48/2281* (2013.01); *F21S 48/2293* (2013.01); *G02B 6/001* (2013.01); *G02B 6/0075* (2013.01)

(56) References Cited

U.S. PATENT DOCUMENTS

| | | |
|---|---|---|
| 8,882,316 B2 | 11/2014 | Natsume et al. |
| 9,303,838 B2 | 4/2016 | Ogata et al. |
| 2008/0049447 A1 * | 2/2008 | Jung .......................... F21S 8/00 362/612 |
| 2012/0069592 A1 | 3/2012 | Natsume et al. |
| 2013/0044503 A1 | 2/2013 | Mihara et al. |
| 2014/0153272 A1 * | 6/2014 | Giraud ................ F21S 48/2237 362/511 |
| 2014/0211493 A1 * | 7/2014 | Ichikawa ............ F21S 48/2237 362/511 |
| 2015/0008840 A1 | 1/2015 | Reinprecht et al. |
| 2015/0055361 A1 | 2/2015 | Ogata et al. |
| 2015/0362659 A1 | 12/2015 | Nishihata et al. |
| 2016/0102834 A1 | 4/2016 | Yamada et al. |

FOREIGN PATENT DOCUMENTS

| | | | |
|---|---|---|---|
| EP | 2620790 A1 * | 7/2013 | ............ G02B 6/001 |
| FR | 3009601 A1 | 2/2015 | |
| WO | 2014119318 A1 | 8/2014 | |
| WO | 2014192572 A1 | 12/2014 | |
| WO | 2015029852 A1 | 3/2015 | |

* cited by examiner

LIGHTING DEVICE, NOTABLY FOR MOTOR VEHICLES, AND LIGHTING AND/OR SIGNALLING MODULE INCLUDING SUCH A DEVICE

CROSS-REFERENCE TO RELATED APPLICATIONS

This application claims priority to the French application 1554780 filed May 27, 2015, which applications are incorporated herein by reference and made a part hereof.

BACKGROUND OF THE INVENTION

1. Field of the Invention

The invention concerns a lighting device, notably for motor vehicles. The invention further concerns a headlight or a lighting and/or signalling module for motor vehicles including such a lighting device. The present invention is in particular intended for equipping motor vehicles.

2. Description of the Related Art

In this field, it is known to use lighting devices including a light source, generally a light-emitting diode, and a light guide through which a light beam emanating from the source propagates. The light is reflected to the outside by reflection means disposed on the surface of the guide. In addition to a lighting function, these devices notably make it possible to enhance the aesthetics of a vehicle.

Lighting devices are known that include two light guides connected to a light source in a junction zone of the light guides. These light guides diverge from each other to form two distinct branches, both emitting light. In other words, the lighting device then assumes a Y-shape the two branches of which are illuminated.

In order to improve the aesthetics of this type of lighting device, it is further known to use an intermediate body making it possible to modify the appearance of the lighting device when lit. The intermediate body, a portion of which is adapted to emit light, is designed to be mounted between the two branches of the device so that the emitting part of the lighting device no longer assumes a Y-shape but that of a single C-shaped linear guide. Users generally prefer this C-shape.

However, these devices have the drawback of having portions, notably two portions, that do not emit light at the level of the contact surfaces between the intermediate body and the emitting branches. In other words, the emission of light along the C-shape is discontinuous, which creates shadow areas and degrades the visual appearance of the device.

SUMMARY OF THE INVENTION

One of the objectives of the invention is to resolve the drawback cited above. To this end, the invention proposes a lighting device, notably for motor vehicles, including two so-called principal light guides and a so-called connecting light guide, each principal guide including a lateral surface, the connecting guide being continuous with both of the principal guides at the level of their respective lateral surface, the device being configured to feed the connecting guide with light from the principal guides.

As a result, the junction between the connecting guide and the principal guides makes it possible to eliminate the shadow areas referred to above.

In accordance with various embodiments of the invention, separately or in combination:

- a portion of one of the principal guides is situated in the vicinity of a portion of the other principal guides, the principal guides diverging from each other at the level of a divergence region,
- the device further includes an intermediate body enabling light to be guided from the principal guides to the connecting guide, the intermediate body being situated at the level of the divergence region,
- the connecting guide includes means for passage of light, the passage means being designed to allow light to pass between the intermediate body and the connecting guide,
- the connecting guide and the intermediate body are separated from each other by a gap,
- the intermediate body is continuous with one and/or the other of the principal guides,
- the intermediate body includes an emission surface arranged facing the connecting guide,
- the intermediate body includes lateral surfaces joined to the respective lateral surfaces of the principal guides,
- the intermediate body has a thickness that increases in the direction away from the portions of the principal guides in the vicinity of each other,
- the principal guides include reflection patterns,
- the reflection patterns are continuous with the light passage means,
- the reflection patterns and/or the light passage means are reflection prisms,
- the reflection prisms are disposed in relief relative to the surface of the connecting guide,
- the device further includes at least one light source, the light source or sources feeding the principal guides with light,
- the connecting guide is continuous with, notably molded in one piece with, each of the principal guides.

The invention further concerns a lighting and/or signalling module including a lighting device as described above.

These and other objects and advantages of the invention will be apparent from the following description, the accompanying drawings and the appended claims.

BRIEF DESCRIPTION OF THE ACCOMPANYING DRAWINGS

The invention will be better understood and other objects, details, features and advantages thereof will become more clearly apparent in the course of the following detailed explanatory description of at least one embodiment of the invention given by way of purely illustrative and nonlimiting example with reference to the appended diagrammatic drawings.

DETAILED DESCRIPTION OF THE PREFERRED EMBODIMENTS

Figure 1:
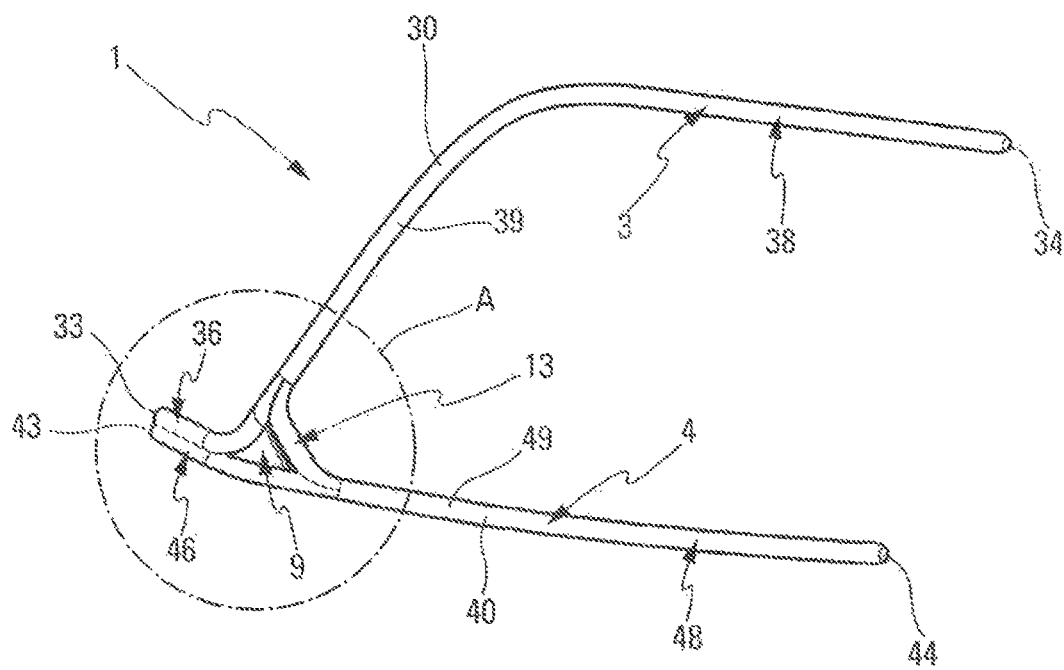
FIG. 1 is a front perspective view of a lighting device in accordance with the invention.
Figure 3:
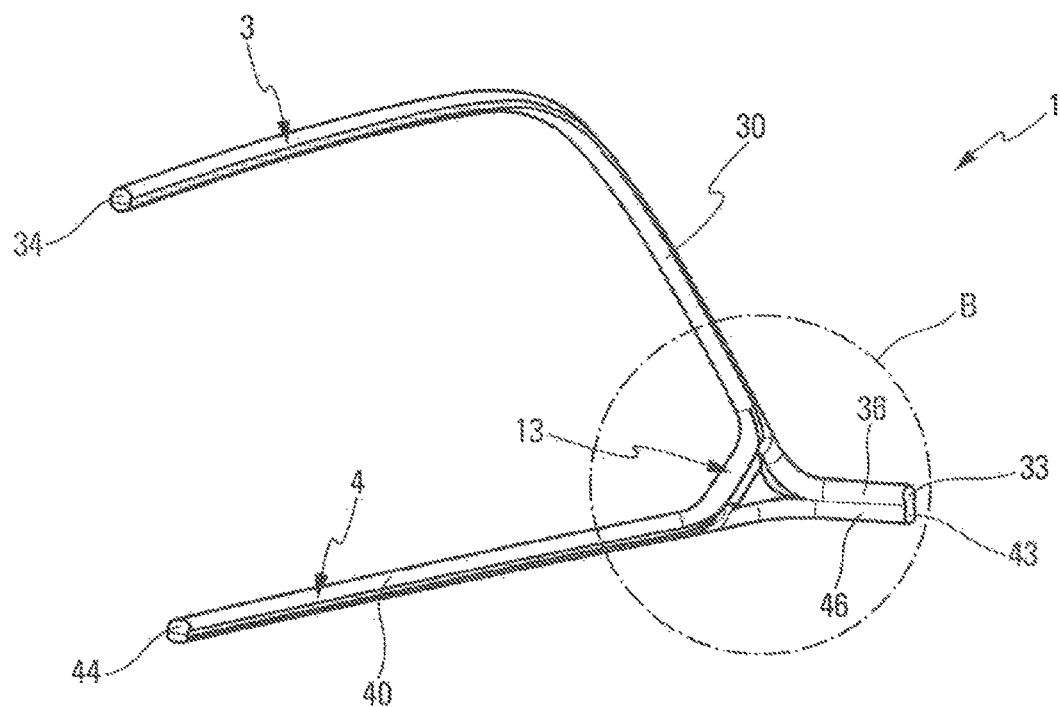
FIG. 3 is a rear perspective view of the lighting device in accordance with the invention.

As shown in FIGS. 1 and 3, the invention concerns a lighting device 1, notably for motor vehicles, including two light guides 3, 4, referred to as the principal guides 3, 4. Each of the principal guides 3, 4 is configured to allow the propagation of light within it, i.e., in an interior volume of each of the principal guides 3, 4. In other words, each of the principal guides 3, 4 is designed to allow the propagation of light beams through the material of each of the principal guides 3, 4 by total reflection. In other words, the principal guides 3, 4 are designed to allow the propagation of the light beams by successive reflections, also referred to as internal reflections, of the light beams.

The principal body of each principal guide 3, 4 is to this end advantageously formed in one piece and of one and the same material. The material is advantageously chosen to favor the propagation of the light beams through the material. Such a material is usually polycarbonate (PC) or polymethylmethacrylate (PMMA).

The principal body of each principal guide 3, 4 being in one piece and made from one and the same material, the light beams can propagate inside the principal guides 3, 4 without encountering an obstacle, separation or physical discontinuity that could compromise the propagation of the light beams. In other words, each principal guide 3, 4 is designed to constitute a uniform medium favoring the propagation of the light beams.

Each of the principal guides 3, 4 advantageously includes a principal body of longitudinal and substantially cylindrical shape. Here each of the principal bodies has a first end 33, 43 and a second end 34, 44 and advantageously extends longitudinally between the first ends 33, 43 and the second ends 34, 44 in accordance with the chosen shape. The principal guides 3, 4 are designed respectively to allow the propagation of the light beams through their principal bodies.

Note that the lighting device 1 is therefore designed to allow the propagation of the light beams from the firsts ends 33, 43 to the respective second ends 34, 44 of the respective principal guides 3, 4.

The principal guides 3, 4 are also advantageously configured to allow emission of the light beams from the interior volume of the principal guides 3, 4 to a space outside them from zones configured for this purpose.

To this end the principal body of each principal light guide 3, 4 has an external lateral surface 30, 40 that extends from the first end 33, 43 to the second end 34, 44 of the principal guide 3, 4. Here the lateral surfaces 30, 40 constitute a boundary between the interior volume of each principal body and the space outside the principal body. In particular, the principal body of each principal guide 3, 4 is designed so that the light beams are reflected at the lateral surface 30, 40 of the principal body to propagate in the principal body except in chosen zones from which they will be able to exit the principal body.

Figure 2:
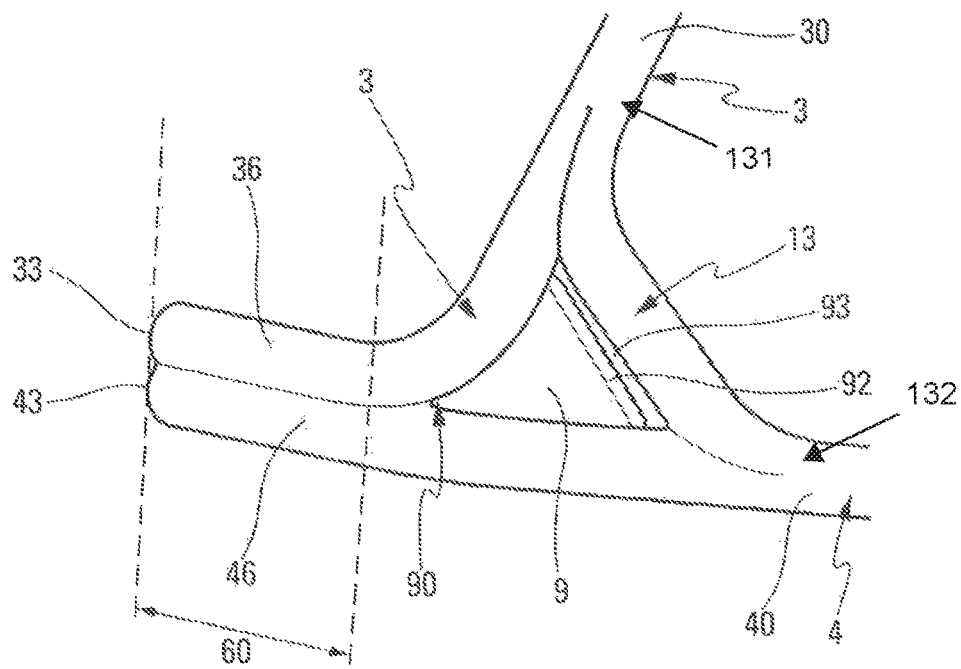
FIG. 2 is a front perspective view of part of the lighting device in accordance with the invention.
Figure 4:
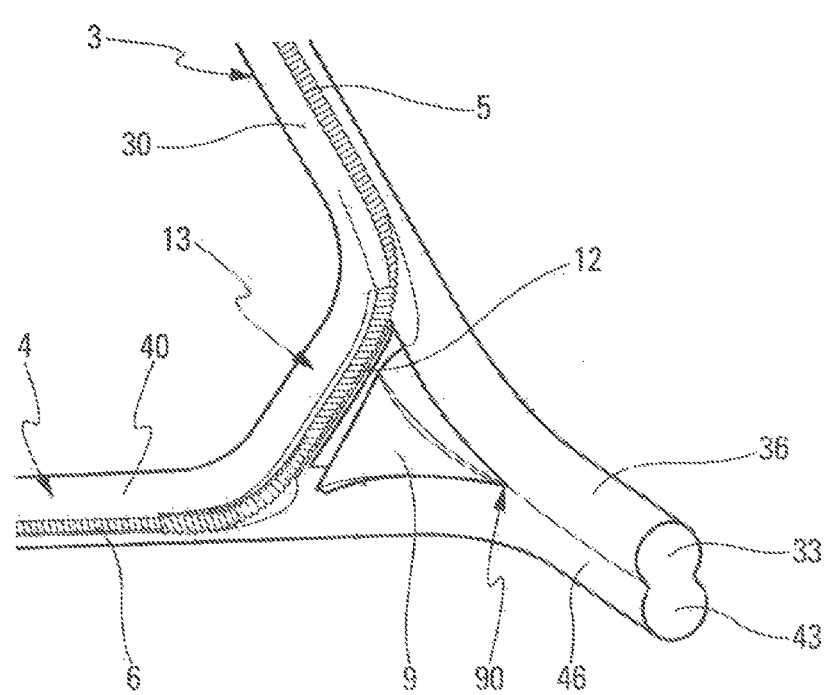
FIG. 4 is a rear perspective view of part of the lighting device in accordance with the invention.

As shown in FIGS. 2 and 4 in particular, a portion 36, 46 of one of the principal guides 3, 4 is advantageously situated in the immediate vicinity of, here in contact with, a portion 36, 46 of the other of the principal guides 3, 4. The portions 36, 46 are referred to as adjacent portions. In particular, here the contact between the two adjacent portions 36, 46 of the principal guides 3, 4 occurs at the level of their lateral surfaces 30, 40. In other words, along the adjacent portions 36, 46 the lateral surfaces 30, 40 of both the principal guides 3, 4 join up and the principal guides 3, 4 are continuous with each other.

Note that the adjacent portion 36, 46 of each principal guide 3, 4 advantageously, although not necessarily, includes the first end 33, 43 of the principal guide 3, 4.

As shown in FIG. 2 in particular, the two adjacent portions 36, 46 of the principal guides 3, 4 conjointly define a junction zone 60 of the lighting device 1. In other words, the principal guides 3, 4 are in contact with each other at the level of the junction zone 60, i.e. along the adjacent portions 36, 46.

It will be noted that here the adjacent portions 36, 46 are substantially parallel to each other. They conjointly have a cross section in the shape of an 8.

Outside the adjacent portions 36, 46, the principal light guides 3, 4 diverge from each other in a divergence region 90. In other words, the principal light guides 3, 4 separate and diverge from each other from the divergence region 90. In other words, the principal guides 3, 4 diverge from each other outside their junction zones of portions 36, 46.

In other words, what is referred to as the "divergence region" 90 is the region at the level of which the principal guides 3, 4 diverge from each other.

In other words, each of the principal guides 3, 4 includes a second portion, referred to as the free portion 38, 48 (FIG. 1), the free portions 38, 48 being spaced from each other. The free portion 38, 48 of each of the principal guides 3, 4 advantageously, although not necessarily, includes the second end 34, 44 of the principal guide 3, 4.

Each of the principal guides 3, 4 can therefore be divided into two portions, namely the adjacent portion 36, 46 and the free portion 38, 48.

It will be noted that the adjacent portions 36, 46 of the principal guides 3, 4 each extend between one of the first ends 33, 43 of the principal guides 3, 4 and the divergence region 90. In other words, the junction zone 60 extends between the first ends 33, 43 of each principal guide 3, 4 and the divergence region 90.

In other words, each principal guide 3, 4 comprises, from its first end 33, 43 to its second end 34, 44, successively and in this order, its adjacent portion 36, 46 and then its free portion 38, 48.

It will be noted that here the free portion 38, 48 of each principal guide 3, 4 extends from the divergence region 90 to its the second end 34, 44.

Figure 5:
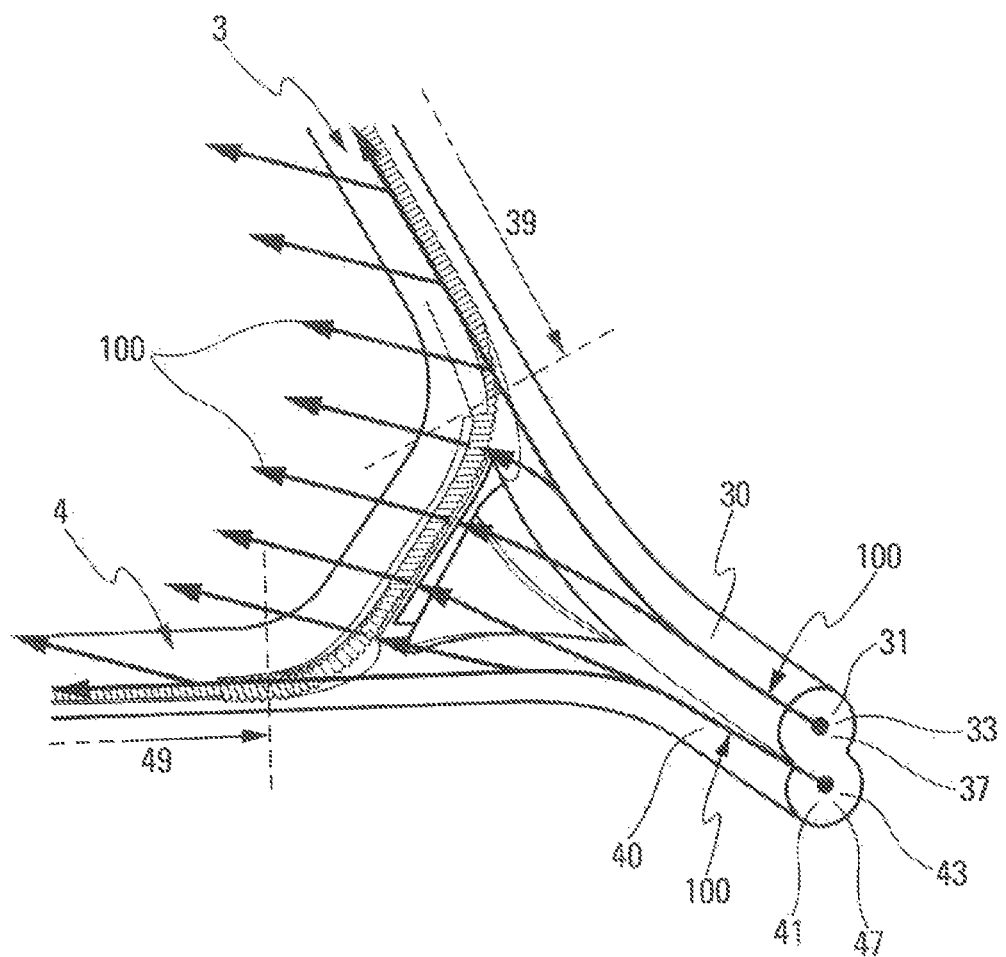
FIG. 5 is a rear perspective view of part of the lighting device in accordance with the invention in which the light beam paths are represented diagrammatically.

As shown in FIGS. 2, 4 and 5, the two principal guides 3, 4 conjointly form what is substantially a Y-shape, the Y-shape being made of up a lower branch and two upper branches. Here the lower branch of the Y-shape is formed by the junction zone 60 of the lighting device 1. Each of the upper branches of the Y-shape is formed by the free portion 38, 48 of one of the principal guides 3, 4.

In accordance with the invention, and as shown in the various figures, the lighting device 1 also includes a connecting guide 13. The lighting device 1 is furthermore configured to feed the connecting guide 13 with light, and therefore with light beams 100 (FIG. 5), from the principal guides 3, 4. Like the two principal guides 3, 4, the connecting guide 13 is designed to enable the propagation of the light beams 100 in an interior volume of the connecting guide 13. Furthermore, the connecting guide 13 is also designed to emit light rays 100 between the interior volume of the connecting guide 13 and a space outside the latter. The connecting guide 13 is arranged between the two principal guides 3, 4, which it connects to each other.

Like the principal guides 3, 4, the connecting guide 13 includes a one-piece body and is produced from one and the same material, namely the same material as that forming the principal bodies of the principal guides 3, 4. The connecting guide 13 is furthermore continuous with both of the principal guides 3, 4 at the level of their respective lateral surface 30, 40. In other words, the principal guides 3, 4 and the connecting guide 13 are made in one piece. This favors the propagation of the light beams 100 between each of the principal guides 3, 4 and the connecting guide 13.

It is noted that the junction between the connecting guide 13 and the principal guides 3, 4 is advantageously at a distance from the first ends 33, 43 and the second ends 34, 44 of the principal guides 3, 4. Here the connecting guide 13 is situated in the vicinity of the divergence region 90 so that the connecting guide 13 and a proximal part of the free portions 38, 48 form a substantially triangular area.

In particular, here the connecting guide 13 is longitudinal and has two ends 131, 132. In other words, the connecting guide 13 advantageously extends longitudinally between the ends 131, 132. Each of the ends 131, 132 of the connecting guide 13 is continuous with the lateral surface 30, 40 of one or the other of the principal guides 3, 4. In other words, each of the ends 131, 132 of the connecting guide 13 coincides with a portion of the lateral surface 30, 40 of one or the other of the principal guides 3, 4.

As stated above and shown in FIG. 5, the connecting guide 13 is advantageously designed to emit light, i.e., light beams 100. The continuity of the material, notably at the level of the junction, between the connecting guide 13 and the principal guides 3, 4 enables the propagation and the emission of the light beams 100 without any shadow area or area of discontinuity being created upon the emission of light beams 100.

The junction between the connecting guide 13 and each of the principal guides 3, 4 is at the level of the free portions 38, 48 of each principal guide 3, 4. In other words, the junctions between the ends 131, 132 of the connecting guide 13 and the lateral surface 30, 40 of each principal guide 3, 4 are at the level of the free portions 38, 48 of the principal guides 3, 4.

Only a portion of each of the principal guides 3, 4, referred to as an emitting area 39, 49, is intended to emit light beams 100. In each principal guide 3, 4 the emitting areas 39, 49 extends along one of the free portions 38, 48, from one of the ends 131, 132 of the connecting guide to one of the second ends 34, 44 of the principal guide 3,4.

Thus the lighting device 1 is designed to emit light beams 100 along the emitting areas 39, 49 of each principal guide 3, 4 as well as along the connecting guide 13, from one end 131, 132 to the other end 131, 132 of the latter. The combination of each emitting area 39, 49 and the connecting guide 13 is referred to as the illuminated portion of the lighting device 1.

Thanks to the invention, the lighting device 1 is adapted to emit light beams 100 without any discontinuity and without any shadow area along the illuminated portion. As can be seen in FIGS. 2, 4 and 5 in particular, the illuminated portion of the lighting device 1 is advantageously C-shaped.

Alternatively, the illuminated portion of the lighting device 1 could have any other shape. For example, in an embodiment not illustrated in the figures, the second ends 34, 44 of each principal guide 3, 4 could be joined to each other, notably continuous with each other. In this case, the illuminated portion defines a loop and is substantially O-shaped.

Each of the principal light guides 3, 4 advantageously includes reflection means 5, 6. The reflection means 5, 6 are for example reflection patterns and/or prisms. They are arranged continuously and regularly along the emitting area 39, 49 of each principal guide 3, 4, at the level of the lateral surfaces 30, 40 of the latter. The reflection means 5, 6 are designed and arranged so that some of the light beams 100 can be reflected at the reflection means 5, 6. The reflection of those light beams 100 at the reflection means 5, 6 enables them to exit the principal guides 3, 4, in particular the principal body of each of the of principal guides 3, 4. The reflection means 5, 6 therefore allow the diffusion of the light beams 100 from the interior volume of each principal guide 3, 4 to a space outside it. In other words, the reflection means 5, 6 allow the emission of the light beams 100 by each of the principal guides 3, 4.

The connecting guide 13, for its part, advantageously includes light passage means 12. Here the light passage means 12 are arranged continuously and regularly along all of the length of the connecting guide 13, from one end 131, 132 to the other end 131, 132 of the latter. The passage means 12 are designed to allow passage of the light beams 100 between each of the principal guides 3, 4 and the connecting guide 13 as explained below in relation to the description of an intermediate body 9.

The passage means 12 of the connecting guide 13 advantageously include reflection means further designed to enable the connecting guide 13 to emit light beams 100. The emission of light by the connecting guide 13 thanks to the reflection means of the latter is similar to the emission of light from each principal guide 3, 4 thanks to the reflection means 5, 6 of the latter.

As shown in FIGS. 4 and 5, the reflection means 5, 6 of each principal guide 3, 4 are advantageously arranged continuously with the passage means 12 of the connecting guide 13. This continuous arrangement contributes to homogeneous, continuous and regular illumination without shadow areas of the illuminated portion of the lighting device 1.

The lighting device 1 advantageously further includes the intermediate body 9. The intermediate body 9 is designed to enable the light beams 100 to be guided from each of the principal guides 3, 4 to the connecting guide 13. In particular, the intermediate body 9 enables guiding of some of the light beams 100 from each of the principal guides 3, 4 to the passage means 12 of the connecting guide 13.

The intermediate body 9 is advantageously arranged at the level of the divergence region 90, i.e. between the junction area 60 of the lighting device 1 and the connecting guide 13. The intermediate body 9 is therefore situated between the two principal guides 3, 4. The intermediate body 9 is advantageously in one piece with each of the principal guides 3, 4. In particular, the intermediate body 9 is continuous with and/or in one piece with the lateral surfaces 30, 40 of the principal light guides 3, 4.

Like the body of the connecting guide 13 and the principal bodies of the connecting principal guides 3, 4, the intermediate body 9 is in one piece and made of one and the same material, namely the same material as the principal guides 3, 4 and the connecting guide 13. This single material makes it possible to favor the propagation of the light beams 100 between each of the principal guides 3, 4 and the intermediate body 9.

Here, as shown in FIG. 2, the intermediate body 9 has an emitting surface 92 arranged face-to-face with the connecting guide 13. In particular, the emitting surface 92 is arranged face-to-face with the passage means 12 of the connecting guide 13. The emitting surface 92 is configured to favor the passage of light beams 100 between the intermediate body 9 and the connecting guide 13. In particular, the emitting surface 92 is designed to enhance the passage of the light beams 100 between the intermediate body 9 and the passage means 12 of the connecting guide 13. It will moreover be noted that the emitting surface 92 is advantageously plane, notably so as to enable the light beams 100 to exit the intermediate body 9, as shown in FIG. 5.

Here the intermediate body 9 has a thickness measured in a direction orthogonal to a plane in which the directions of extension of each of the principal guides 3, 4 coincide at the level of the divergence region 90. The thickness of the intermediate body 9 advantageously increases in the direction away from the junction zone 60 of the lighting device 1. In other words, the intermediate body 9 has an increasing thickness in the direction away from the adjacent portions 36, 46 of the principal guides 3, 4. It will moreover be noted that here the intermediate body 9 is substantially wedge-shaped. In cross section parallel to the plane, the intermediate body 9 advantageously has a substantially triangular shape, espousing two of the sides of the triangle formed by the principal guides 3, 4 and the connecting guide 13.

It will also be noted that, for correct propagation of the light beams 100 between them, the intermediate body 9 and the connecting guide 13 are advantageously separated from each other by a gap 93 or a slot situated between the emitting surface 92 and the connecting guide 13.

As shown in FIG. 5, the lighting device 1 could include at least one light source, here two light sources, not shown, designed to emit the light beams 100 toward the interior space 31, 41 of each of the principal guides 3, 4. Each light source could itself include one or more light-emitting diodes, here one diode. Each of the light sources is for example arranged at the level of the first end 33, 43 of each of the principal light guides 3, 4. In this regard, each of the principal guides 3, 4 includes an entry surface 37, 47, for example, the entry surface 37, 47 being arranged at the level of the first end 33, 43 substantially perpendicularly to the lateral surface 30, 40.

The entry surface 37, 47 of each principal guide 3, 4 is advantageously disposed facing one of the light sources, in the vicinity thereof, so as to allow entry of the light beams 100 into the principal guide 3, 4 through the entry surface 37, 47.

It will be noted that the connecting guide 13 is advantageously molded in one piece with each of the principal guides 3, 4.

On this subject, the prisms or passage means 12 of the connecting guide 13 are advantageously situated in relief relative to its lateral surface 30, 40. This facilitates the design of the mold used to fabricate the lighting device 1.

It will be noted that here the principal guides 3, 4, the connecting guide 13 and the intermediate body 9 are molded in one piece with one another from the same material. The principal guides 3, 4, the connecting guide 13 and the intermediate body 9 are advantageously in one piece.

The invention further concerns a lighting and/or signalling module, such as a headlamp or a day running light module or a rear lamp, including the lighting device 1 as described above, for example associated with other lighting devices such as low beam unit, high beam unit, turn indicator unit or other lamps in a headlamp.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for motor vehicles, comprising:
   two principal light guides;
   a connecting light guide; and
   an intermediate body enabling light to be guided from the two principal light guides to the connecting light guide,
   wherein the principal light guides diverge from each other at a level of a divergence region, and the intermediate body is positioned at the divergence region,
   wherein each of said principal light guides includes a lateral surface,
   wherein said connecting light guide is continuous with both of said principal light guides at a level of their respective lateral surface so that the connecting light guide and the two principal light guides are formed as one piece, and
   wherein light from said lighting device is guided from the two principle light guides to the connecting light guide through the intermediate body.

2. The lighting device according to claim 1, wherein a portion of one of said principal light guides is situated in a vicinity of a portion of the other of said principal light guides.

3. The lighting device according to claim 1, wherein said connecting light guide includes passage means for passage of light, said passage means being designed to allow light to pass between said intermediate body and said connecting light guide.

4. The lighting device according to claim 3, in which said connecting light guide and said intermediate body are separated from each other by a gap.

5. The lighting device according to claim 4, wherein said intermediate body is continuous with one and/or the other of said principal light guides.

6. The lighting device according to claim 3, in which said principle light guides include reflection patterns continuous with said passage means.

7. The lighting device according to claim 6, in which said reflection patterns and/or said passage means are reflection prisms.

8. The lighting device according to claim 7, in which said reflection prisms are disposed in relief relative to a surface of said connecting light guide.

9. The lighting device according to claim 1, in which said intermediate body includes an emission surface arranged facing said connecting light guide.

10. The lighting device according to claim 1, in which said intermediate body includes lateral surfaces, joined to the respective lateral surfaces of said principal light guides.

11. The lighting device according to claim 1, in which said intermediate body has a thickness that increases in a direction away from portions of said principal light guides in the vicinity of each other.

12. The lighting device according to claim 1, further including at least one light source, said at least one light source or light sources feeding said principal light guides with light.

13. The lighting device according to claim 1, in which the connecting light guide is continuous with, notably molded in one piece with, each of said principal light guides.

14. A lighting and/or signaling module including a lighting device according to claim 1.

15. A lighting device for motor vehicles, comprising:
   a first principal light guide;
   a second principal light guide; and
   a connecting light guide,
   an intermediate body enabling light to be guided from said first and second principal light guides to the connecting light guide, the intermediate body being situated in a divergence region of the first and second principal light guides,
   wherein each of said first and second principal light guides includes a lateral surface, wherein said connecting light guide being situated in the divergence region of said first and second principal light guides, wherein said connecting light guide and the principal light guides are formed as one piece, and wherein light from said lighting device is guided from the two principle light guides through the intermediate body and to the connecting light guide.

16. The lighting device according to claim 15, wherein a portion of one of said first or second principal light guides is situated in a vicinity of a portion of the other of said first or second principal light guides, said first and second principal light guides diverging from each other at a level of said divergence region.

17. The lighting device according to claim 15, wherein said connecting light guide includes a passage for passage of light, said passage being designed to allow light to pass between said intermediate body and said connecting light guide.

18. The lighting device according to claim 15, in which said connecting light guide and said intermediate body are separated from each other by a gap.

* * * * *